Figure 1:
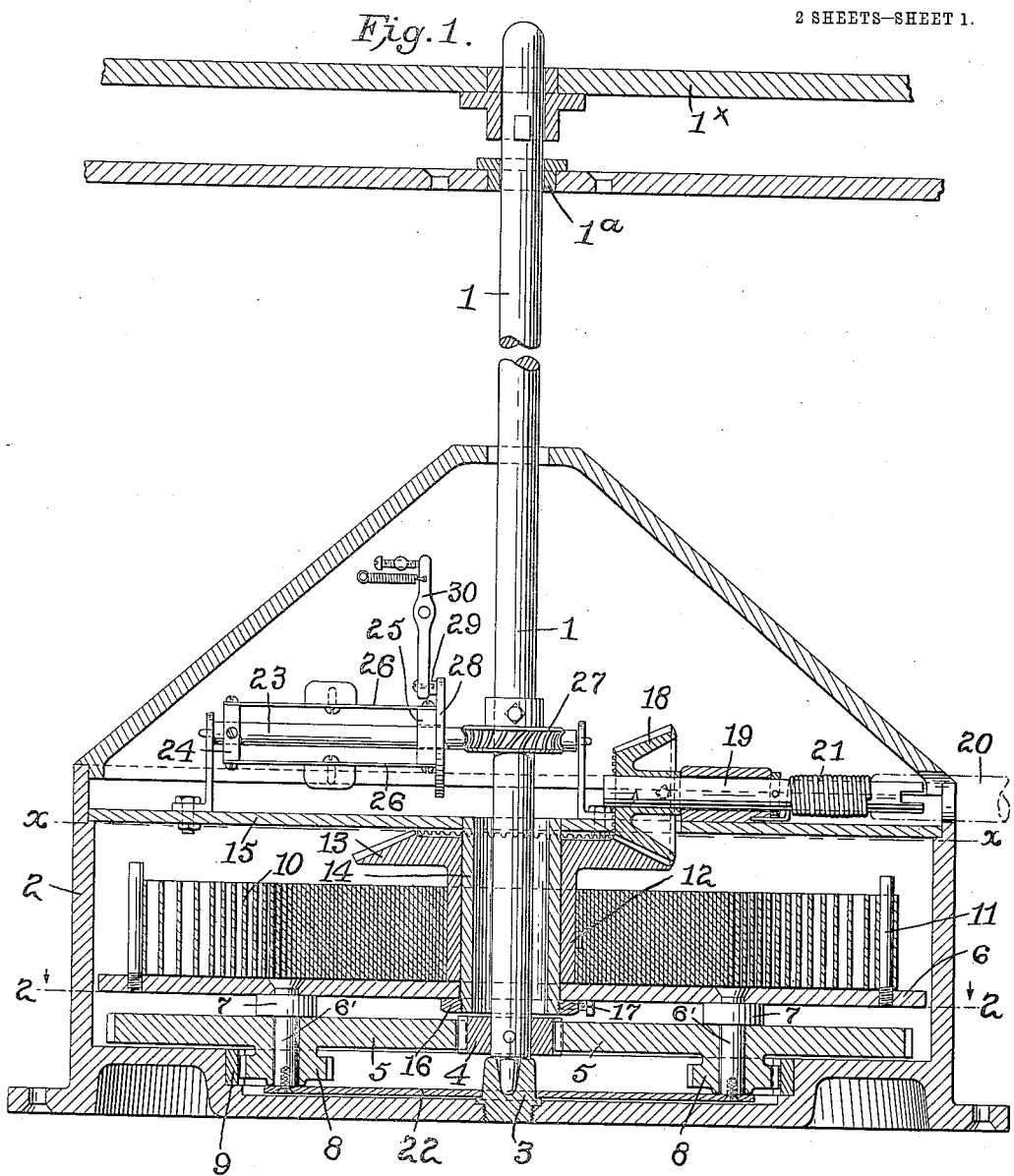

J. M. EVANS.
MOTOR FOR PHONOGRAPHS AND OTHER PURPOSES.
APPLICATION FILED MAR. 3, 1911. RENEWED MAR. 13, 1912.

1,042,660.

Patented Oct. 29, 1912.

2 SHEETS—SHEET 1.

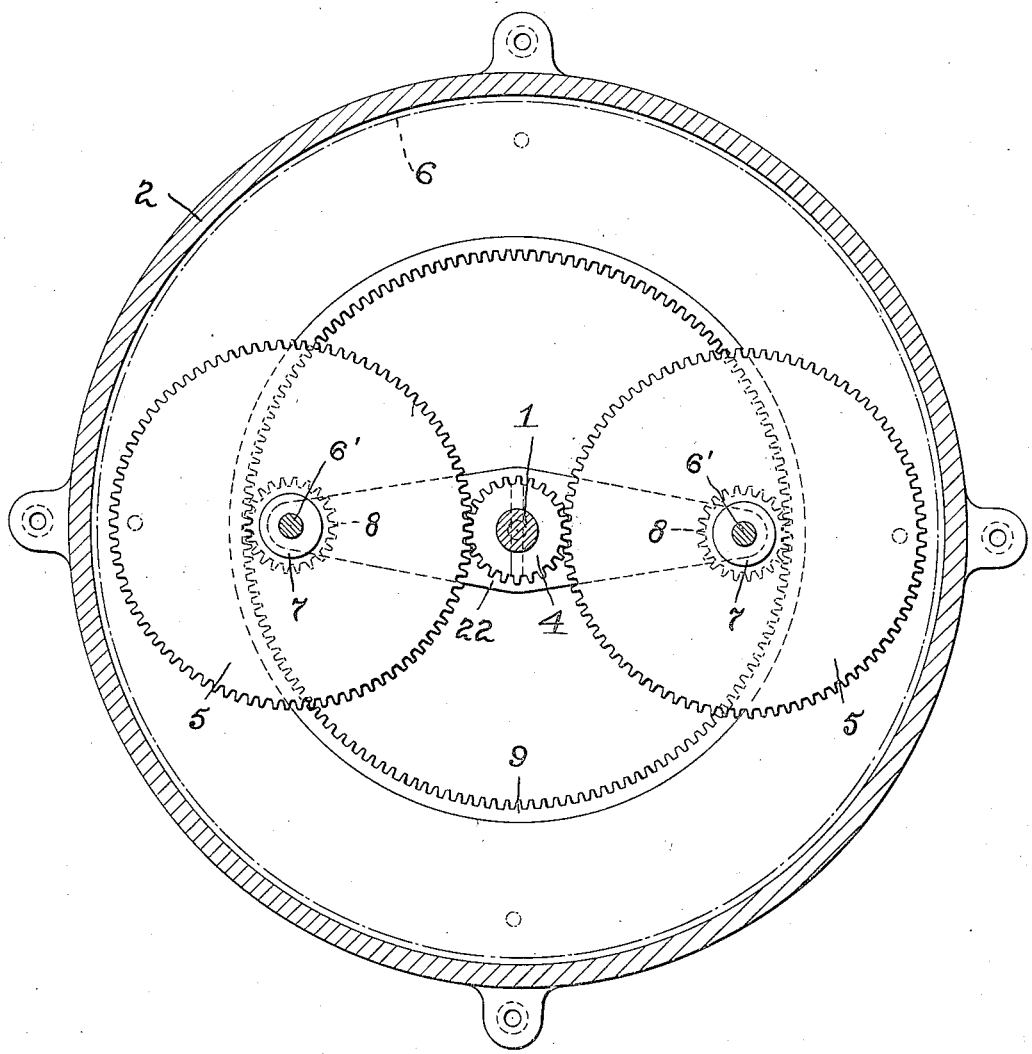

UNITED STATES PATENT OFFICE.

JAMES M. EVANS, OF WESTPORT, CONNECTICUT.

MOTOR FOR PHONOGRAPHS AND OTHER PURPOSES.

1,042,660.  Specification of Letters Patent.  Patented Oct. 29, 1912.

Application filed March 3, 1911, Serial No. 612,115. Renewed March 13, 1912. Serial No. 683,609.

*To all whom it may concern:*

Be it known that I, JAMES M. EVANS, citizen of the United States, residing at Westport, Connecticut, have invented certain new and useful Improvements in Motors for Phonographs and other Purposes, of which the following is a specification.

My invention relates to motor mechanism, and as an instance of its application to practical use I show it as adapted to phonographs or talking machines.

One object of my invention is to eliminate side thrust in the transmitting mechanism, thereby reducing friction and wear, and eliminating spring of the casing due to unequal strains thereon, thus eliminating also binding of the working parts, and insuring a proper working of the machine, an even running of the record holding table and a true reproduction of the composition.

The invention consists in the features and combination and arrangement of parts hereinafter described and particularly pointed out in the claims.

In the accompanying drawings Figure 1 is a central vertical section through the motor mechanism; Fig. 2 is a plan view of a section substantially on the line 2—2 of Fig. 1.

In these drawings, 1 is the vertical shaft which carries at its upper end the record holding table 1ˣ; about this central shaft is the casing 2 of symmetrical form, the shaft being stepped in a bearing 3 in the bottom of the casing, this stepped bearing consisting of a block having a conical recess receiving the conical lower end of the shaft, the socket opening being of slightly greater diameter than the diameter of the conical end of the shaft. At its upper portion the shaft passes through an opening in the top of the casing, and it has a bearing 1ª above this point in the frame of the phonograph. The shaft has a pinion 4 pinned thereon, which is engaged by gear wheels 5 at diametrically opposite points. These gears are carried by a rotary plate 6 which has pins 6′ depending therefrom furnishing journals for the gears, the pins being riveted or otherwise fixed to the plate, and having enlarged portions 7 fitting over the gears to hold them down in place. The gears have formed therewith or attached thereto pinions 8 which mesh with an annular rack 9 fixed to the casing.

The plate 6 is rotated by a coiled spring 10, one end of which is attached thereto at 11, and the other end to the hub or sleeve 12 of the winding bevel gear 13, said sleeve or hub turning on a sleeve or tubular member 14 depending from the partition or frame plate 15 of the casing and having a flange or collar 16 screwed on its lower end upon which the spring carrying plate rests, and turns. This flange may be locked in place by a set screw 17. The winding gear 13 is turned by a bevel pinion 18 pinned to the shaft 19 with which the winding crank engages, as shown in dotted lines at 20. Any suitable form of detent means may be employed to hold the winding shaft against reverse movement, and as one form of such means I have shown a spiral spring brake 21 surrounding the shaft and having one end fixed in the frame, the action being that the winding shaft can be turned forwardly but not backwardly. A brace rod or plate 22 connects together the two journal pins 6′.

In operation it will be observed that a balanced motor drive is provided, the power being transmitted without tendency to bring unequal pressures upon the transmitting elements or the casing, thus avoiding springing of the latter and such binding of the parts as will prevent perfect results in the driving of the table carrying shaft uniformly and without side play.

The gears 5 meshing with the pinion at diametrically opposite points thereof compensate one for the other in preventing side thrust of the shaft in its bearing, and this is true also of the two pinions 8, side thrust on one due to its engagement with the fixed rack being compensated for or counteracted by the action of the pinion at the opposite side of the shaft meshing with the rack. It will be further seen that the vertical shaft passes freely through the central sleeve or a tubular hanger 14, without bearing therein, and by reason of the arrangement of the spring and the compensating gearing the shaft will run true and with a minimum of friction.

Any suitable form of governor may be employed, and as a representative form of the same I show a shaft 23 mounted in suitable bearings, and carrying fixed thereto an arm 24 and a slidable arm 25 to which flexible members or springs 26 are attached carrying governor weights. The shaft is driven by worm gearing at 27. The shaft also carries a brake disk 28 upon which a brake shoe 29 bears, this being mounted on a lever 30 pivotally supported in the casing.

By reason of the general form of the apparatus the upright table carrying shaft and the gearing, the parts may be kept well lubricated by filling the casing with oil to any desired height to submerge more or less of the driving elements, the oil vapor finding its way to the parts above the liquid level of the oil. I have shown the oil level by the line $x$—$x$, as an example.

It will be observed that the bottom and sides of the casing are formed in one piece, and in placing or removing the driving mechanism this is done through the open top of the casing. The casing of the form shown is designed for the purpose of holding the oil in which the mechanism is submerged, there being no joints through which leakage can occur at the bottom of the casing or up to the level at which the oil is filled.

I claim as my invention:

1. In power mechanism of the class described, a casing, a vertical transmitting shaft therein, a pinion on the shaft, gears meshing with the pinion at substantially diametrically opposite points thereof, pinions turning with the gears, a rack fixed in the casing with which the pinions engage, a rotary carrier for the gears and pinions turning about the vertical shaft, means for turning the carrier, substantially as described.

2. In power mechanism of the class described, a casing, a vertical transmitting shaft therein, a pinion on the shaft, gears meshing with the pinion at substantially diametrically opposite points thereof, pinions turning with the gears, a rack fixed in the casing with which the pinions engage, a rotary carrier for the gears and pinions turning about the vertical shaft, means for turning the carrier, said means for turning the carrier consisting of a spring surrounding the shaft, substantially as described.

3. In combination the vertical shaft having a stepped bearing at its lower end, a horizontal plate at the upper end of the shaft to rotate therewith, a bearing for the upper end of the shaft, a pinion at the lower end of the shaft, gears meshing with the pinion at diametrically opposite points thereof, pinions fixed axially of the gears, a rack engaging the pinions and fixed to the casing, a tubular hanger through which the shaft freely passes, a carrier for the gears and their pinions, said carrier being supported by said hanger to turn about the shaft, a spring surrounding the hanger and having driving connection with the carrier, and means for winding the spring, substantially as described.

4. In combination the vertical shaft having a stepped bearing at its lower end, a horizontal plate at the upper end of the shaft to rotate therewith, a bearing for the upper end of the shaft, a pinion at the lower end of the shaft, gears meshing with the pinion at diametrically opposite points thereof, pinions fixed axially of the gears, a rack engaging the pinions and fixed to the casing, a tubular hanger through which the shaft freely passes, a carrier for the gears and their pinions, said carrier being supported by said hanger to turn about the shaft, a spring surrounding the hanger and having driving connection with the carrier, and means for winding the spring, said winding means including a gear wheel turnable about the tubular hanger and connected with the spring, substantially as described.

5. In combination in apparatus of the class described, a vertical shaft, a casing in the lower part of which the shaft has a bearing, driving mechanism at the lower part of said casing adapted to be submerged in oil, said driving mechanism comprising a spring concentric with the shaft, a carrier operated by the spring, and gearing between the carrier and the shaft, said gearing including gears mounted on the carrier substantially as described.

6. In combination in apparatus of the class described, a casing, a shaft, a spring concentric with the shaft, a carrier concentric with the shaft and driven by the spring, and power transmitting mechanism between the carrier and the shaft, a part of said power transmitting mechanism being mounted on the carrier substantially as described.

7. In combination in apparatus of the class described, a casing, a shaft, a spring concentric with the shaft, a carrier concentric with the shaft and driven by the spring, power transmitting mechanism between the carrier and the shaft, said transmitting mechanism including the pinion on the shaft, and gearing between said pinion and the carrier mounted on and operated by the revolution of said carrier, substantially as described.

In testimony whereof I affix my signature in presence of two witnesses.

JAMES M. EVANS.

Witnesses:
 Ewd. L. Tolson,
 Bennett S. Jones.